(12) United States Patent
Miyakawa et al.

(10) Patent No.: US 8,367,872 B2
(45) Date of Patent: Feb. 5, 2013

(54) CLOSE-BONDED DIFFRACTIVE OPTICAL ELEMENT, OPTICAL MATERIAL USED THEREFOR, RESIN PRECURSOR, AND RESIN PRECURSOR COMPOSITION

(75) Inventors: Akiko Miyakawa, Sagamihara (JP); Masayuki Shijo, Yokohama (JP)

(73) Assignee: Nikon Corporation, Tokyo (JP)

( * ) Notice: Subject to any disclaimer, the term of this patent is extended or adjusted under 35 U.S.C. 154(b) by 1139 days.

(21) Appl. No.: 11/793,523

(22) PCT Filed: Dec. 20, 2005

(86) PCT No.: PCT/JP2005/023364
§ 371 (c)(1),
(2), (4) Date: Jun. 20, 2007

(87) PCT Pub. No.: WO2006/068138
PCT Pub. Date: Jun. 29, 2006

(65) Prior Publication Data
US 2008/0107903 A1    May 8, 2008

(30) Foreign Application Priority Data

Dec. 20, 2004   (JP) .................. 2004-367607

(51) Int. Cl.
*C07C 319/00*  (2006.01)
*C08F 12/30*   (2006.01)
*C08G 75/04*   (2006.01)

(52) U.S. Cl. .............. 568/39; 568/41; 568/45; 526/286; 526/289; 526/290; 528/374; 528/376

(58) Field of Classification Search .................. None
See application file for complete search history.

(56) References Cited

U.S. PATENT DOCUMENTS

| | | | | |
|---|---|---|---|---|
| 5,326,501 A | * | 7/1994 | Ohkubo et al. | 252/582 |
| 5,847,877 A | | 12/1998 | Imamura et al. | |
| 5,880,176 A | * | 3/1999 | Kamoto et al. | 523/172 |
| 5,962,554 A | * | 10/1999 | Pakusch et al. | 523/342 |
| 5,977,276 A | * | 11/1999 | Toh et al. | 526/308 |
| 6,313,251 B1 | * | 11/2001 | Toh et al. | 526/308 |
| 6,533,815 B1 | * | 3/2003 | Widawski | 623/6.56 |
| 6,872,333 B2 | * | 3/2005 | Ishii et al. | 264/1.1 |
| 7,144,954 B2 | * | 12/2006 | Schmitt et al. | 525/123 |

FOREIGN PATENT DOCUMENTS

| | | |
|---|---|---|
| EP | 1 455 200 A1 | 9/2004 |
| JP | 44-4993 | 2/1969 |
| JP | 63-235332 | 9/1988 |
| JP | 04-011613 | 1/1992 |
| JP | 4-11613 | 1/1992 |

(Continued)

OTHER PUBLICATIONS

EIC search report; Aug. 6, 2012.*

(Continued)

*Primary Examiner* — Kevin R Kruer

(57) ABSTRACT

To obtain a close-contact multi-layer type diffractive optical element having a homogeneous high-refractive-index and low-dispersion resin layer, an acrylate-terminated oligomer, obtained by allowing excess bifunctional acrylate to react with bifunctional thiol, is used as a resin precursor for the high-refractive-index and low-dispersion resin layer.

4 Claims, 7 Drawing Sheets

FOREIGN PATENT DOCUMENTS

| | | |
|---|---|---|
| JP | 04-366115 | 12/1992 |
| JP | 09-127321 | 5/1997 |
| JP | 09-127322 | 5/1997 |
| JP | 2000-154251 | 6/2000 |
| JP | 2002-500700 | 1/2002 |
| JP | 2003-171473 | 6/2003 |
| WO | 02/31026 * | 4/2002 |
| WO | 02/31026 A2 | 4/2002 |

OTHER PUBLICATIONS

European Search Report dated Feb. 8, 2011 in corresponding European Patent Application 05819858.1.
International Search Report of International Published Application No. PCT/JP2005/023364 (mailed Mar. 28, 2006).

* cited by examiner

CLOSE-BONDED DIFFRACTIVE OPTICAL ELEMENT, OPTICAL MATERIAL USED THEREFOR, RESIN PRECURSOR, AND RESIN PRECURSOR COMPOSITION

CROSS REFERENCE TO RELATED APPLICATIONS

This application is based on and claims priority to PCT Application No. PCT/JP2005/023364 filed Dec. 20, 2005, and Japanese Application No. 2004-367607 filed Dec. 20, 2004, the disclosures of which are hereby incorporated herein by reference.

BACKGROUND OF THE INVENTION

The present invention relates to a close-contact multi-layer type diffractive optical element, an optical material that is a resin used in the optical element, a resin precursor, and a resin precursor composition.

A close-contact multi-layer type diffractive optical element, in which two optical members made of an optical material are in close contact with each other and an interface therebetween constitutes a diffraction grating, has an advantage in that usage wavelength can be enlarged, and it is easy to align gratings.

In the close-contact multi-layer type diffractive optical element, for example, as described in Japanese Patent Application Laid-open No. Hei 09-127322, optical characteristics of two optical members sandwiching a diffractive optical plane are required to have a high refractive index and low dispersion, and a low refractive index and high dispersion, relative to each other. As a general existing low-refractive-index and high-dispersion resin, for example, there is a plastic for optical use described in Japanese Patent Application Laid-open No. Hei 04-366115. Regarding two optical members of the close-contact multi-layer type diffractive optical element, it is required that one of the optical members is made of a low-refractive-index and high-dispersion resin, and the other is made of a high-refractive-index and low-dispersion resin relative to the low-refractive-index and high-dispersion resin.

As an optical material used in an optical member of the close-contact multi-layer type diffractive optical element, a resin is suitable since the resin is capable of reducing weight of the element and production of the element can be realized at a low cost with mass-productivity enhanced. In particular, a UV-curable resin is desirable because it has excellent transferability, takes a short time for curing, does not require a heat source, and the like, which can further reduce the cost. However, in a resin conventionally used in an optical field, it is difficult to realize special optical characteristics of low dispersion while having a high refractive index.

SUMMARY OF THE INVENTION

Thus, an object of the present invention is to provide a high-refractive-index and low-dispersion resin preferable for an optical material used in a close-contact multi-layer type diffractive optical element, a precursor thereof, a composition containing the precursor, and a close-contact multi-layer type diffractive optical element using those described above.

In order to achieve the above-mentioned object, the inventors of the present invention have investigated relationships between chemical structure and composition, and the refractive index and dispersion, with respect to resins having various structures. Consequently, they found that a resin having an alicyclic skeleton has small dispersion. They also found that a compound having sulfur atoms has a high refractive index.

Thus, considering that usage of a UV-curable resin having both structures is preferable, the inventors of the present invention have produced a close-contact multi-layer type diffractive optical element by curing a composition made of an acrylate having an alicyclic skeleton, thiol containing sulfur atoms, and a photopolymerization initiator with irradiation of UV-rays. However, there were problems in that working environment deteriorates due to odor of thiol, and curing becomes non-uniform since reaction rate of adding an acryloyl group to a mercapto group is very different from reaction rate of homopolymerization of an acryloyl group.

In order to solve the above-mentioned problems, according to the present invention, an acrylate-terminated oligomer obtained by allowing excess acrylate to react beforehand with thiol is used as a resin precursor, and the acrylate-terminated oligomer with a photopolymerization initiator added thereto is used as a UV-curable resin composition. The acrylate-terminated oligomer used in the present invention has no thiol odor due to absence of a mercapto group. Such an acrylate-terminated oligomer can be synthesized by allowing a mercapto group to react with an acryloyl group using an excess amount of acrylate with respect to thiol, with tertiary amines being a catalyst, for example.

According to an aspect of the present invention, there is provided a close-contact multi-layer type diffractive optical element including two optical members that are in close contact with each other, an interface between the optical members constituting a diffraction grating, in which one of the optical members is made of a resin which is a cured substance of a resin precursor composition containing a photopolymerization initiator and an acrylate-terminated oligomer obtained by allowing excess bifunctional acrylate to react with bifunctional thiol.

Further, according to the present invention, there is provided a resin precursor that is an acrylate-terminated oligomer obtained by allowing excess bifunctional acrylate to react with bifunctional thiol, a resin precursor composition containing the precursor, and a cured substance of the a resin precursor composition.

Further, according to the present invention, a resin precursor composition for a close-contact multi-layer type diffractive optical element in which a refractive index $n_d$ at a wavelength of 587.56 nm of a d-line of a cured resin is 1.55 or more, and a mean dispersion of the cured resin, i.e., a difference ($n_F - n_C$) between a refractive index $n_F$ at a wavelength of 486.13 nm of an F-line and a refractive index $n_C$ at a wavelength of 656.27 nm of a C-line is 0.013 or less, an optical material that is the cured substance of the resin precursor composition, and a close-contact multi-layer diffractive optical element using the optical material are provided. The resin precursor composition of the present invention contains an acrylate-terminated oligomer and a photopolymerization initiator obtained by allowing excess bifunctional acrylate to react with bifunctional thiol.

According to the present invention, an optically homogeneous high-refractive-index and low-dispersion resin layer can be formed by unifying reaction sites of resin precursor with an acryloyl group while realizing a high refractive index owing to presence of sulfur atoms in molecules, and the working environment is not degraded due to the odor of thiol by previously subjecting a mercapto group to reaction, whereby a close-contact multi-layer diffractive optical element can be produced efficiently.

DETAILED DESCRIPTION OF THE INVENTION

Figure 1:
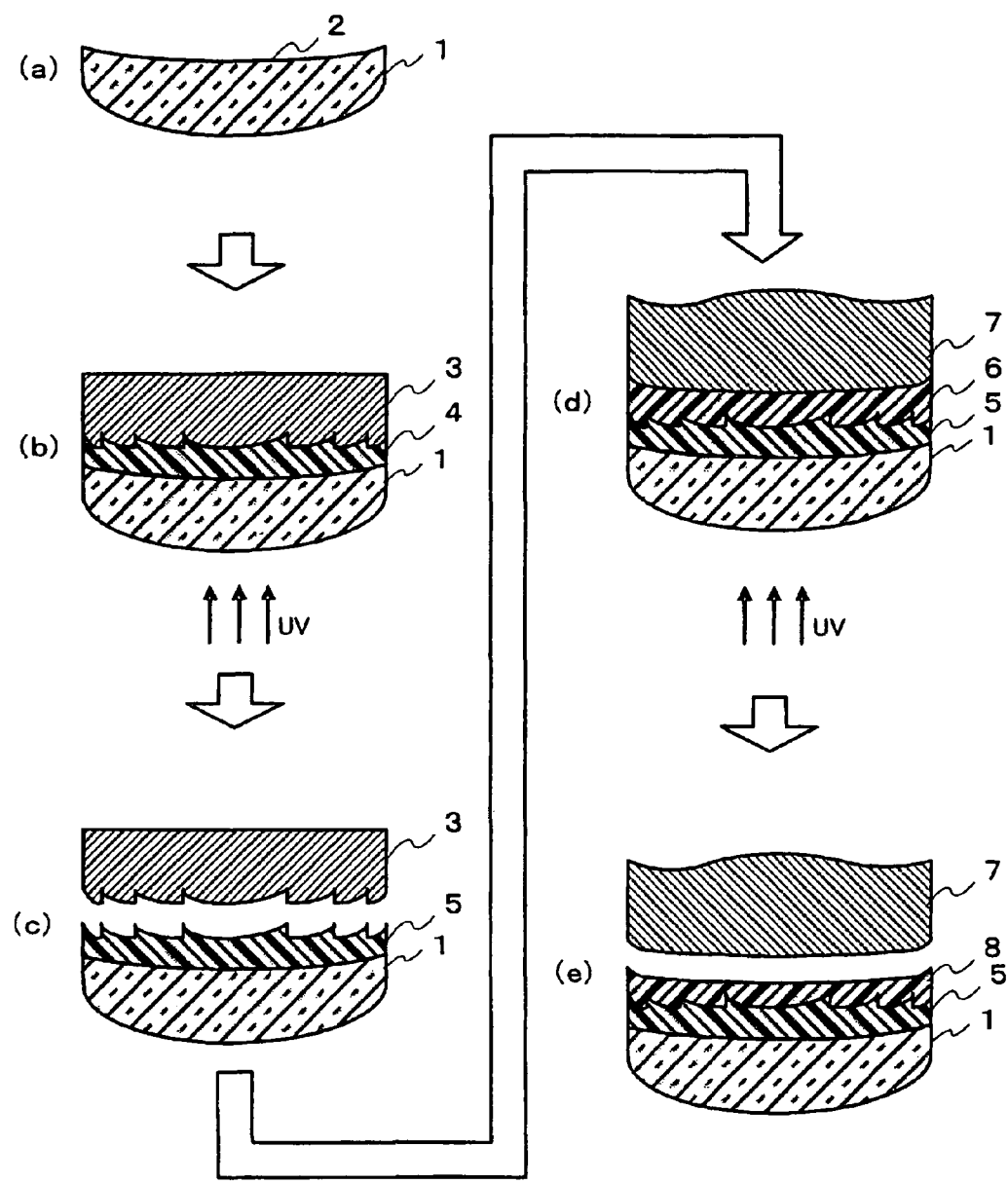
FIGS. 1(a) to 1(e) are explanatory views illustrating production steps of a close-contact multi-layer type diffractive optical element according to Example 1 of the present invention.

In a close-contact multi-layer type diffractive optical element, optical characteristics of optical members sandwiching a diffractive optical plane are required to have a high refractive index and low dispersion, and a low refractive index and high dispersion relative to each other. Hereinafter, a general already-existing low-refractive-index and high-dispersion resin will be described, using as an example a plastic ($n_d$=1.5424, $v_d$=32.4, mean dispersion=0.01674) for optical use having a low refractive index and high dispersion described in Example 2 of Japanese Patent Application Laid-open No. Hei 04-366115.

Assuming that the refractive indices at a wavelength of $\lambda_0$ of a high-refractive-index and low-dispersion material and a low-refractive-index and high-dispersion material are respectively $n_{1(\lambda_0)}$ and $n_{2(\lambda_0)}$, a grating height $d_0$ optimized so that an $m_0$th-order diffraction efficiency becomes 100% at the wavelength of $\lambda_0$ is expressed as follows.

$$(n_{1(\lambda_0)} - n_{2(\lambda_0)}) \times d_0 = m_0 \times \lambda_0$$

More specifically, the grating height $d_0$ is inversely proportional to the refractive index difference between the high-refractive-index and low-dispersion material and the low-refractive-index and high-dispersion material.

The resin of the present invention has $n_d$ of 1.55 or more. For example, a resin having $n_d$ of 1.55 is excellent in the following aspects. When a close-contact multi-layer type diffractive optical element is produced by combining the resin having $n_d$ of 1.55 with the above-mentioned existing low-refractive-index and high-dispersion resin so that a 1st-order diffraction efficiency is 100% at a d-line, $\lambda d$ is 0.587562 μm and $d_0$ is 77.3 μm, thereby realizing a very low grating height. Further, the optical element thus produced has less dependence on angle of view. Further, the lower the grating height is, the more easily mold-making and release after the molding can be conducted, which implies excellence in productivity. Further, the resin of the present invention realizes a mean dispersion lower than that of existing high-refractive-index resins.

Accordingly, the resin, the precursor thereof, and the composition containing the precursor of the present invention have excellent optical characteristics with which a very low grating height can be realized, which has not been realized conventionally, by combining with existing low-refractive-index, high-dispersion resin, and hence, are preferable particularly for a close-contact multi-layer type diffractive optical element.

In the present invention, as the resin precursor, an acrylate-terminated oligomer is used, which is a reaction product obtained by allowing bifunctional thiol to react with excess bifunctional acrylate. As the acrylate-terminated oligomer used in the present invention, one having a structure represented by the following general formula (1) is preferable. Further, in order to realize the appropriate viscosity capable of maintaining satisfactory workability at room temperature, it is desirable that an average of a repetition number n in the general formula (1) be less than 4. The reaction sites that contribute to the polymerization at time of curing with UV-rays are unified, so that the non-uniformity caused by the difference in a rate of curing can be avoided.

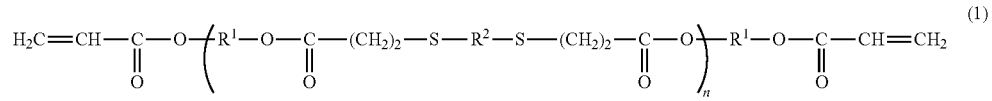

(1)

(where $R^1$ represents a divalent organic group (preferably, an alkylene group) containing 7 to 15 carbon atoms having an alicyclic skeleton, $R^2$ represents an alkylene group containing 2 to 20 carbon atoms or a polythiaalkylene group containing 2 to 20 carbon atoms, and n represents a positive integer.)

If acrylate or thiol is trifunctional, they may be gelled during reaction, so they are required to be bifunctional. Further, the molar ratio between bifunctional acrylate and bifunctional thiol is desirably 1.5:1 to 10:1, and more desirably 2.5:1 to 5:1. If the content of thiol is increased, the refractive index increases. However, if the content of thiol is increased too much, the viscosity of an acrylate-terminated oligomer increases too much, with the result that the workability may be degraded.

When the content of thiol is decreased too much, although the viscosity can be decreased, a desired refractive index may not be obtained.

As bifunctional acrylate preferable for the present invention, there is diacrylate with acryloyloxy groups bonded to both terminals of a divalent organic group containing 7 to 15 carbon atoms having an alicyclic skeleton, represented by the following general formula (2).

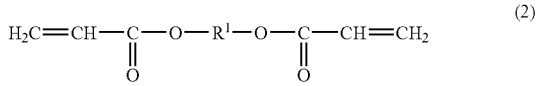

(2)

(where $R^1$ represents a divalent organic group (preferably, an alkylene group) containing 7 to 15 carbon atoms having an alicyclic skeleton.)

Examples of such diacrylate include bicyclo[3.2.0]heptane, bicyclo[2.2.1]heptane, bicyclo[4.1.0]heptane, bicyclo[2.2.2]octane, bicyclo[3.3.0]octane, bicyclo[3.2.1]octane, bicyclo[4.3.0]nonane, bicyclo[3.3.1]nonane, bicyclo[4.3.1]decane, bicyclo[3.3.3]undecane, bicyclo[4.3.2]undecane, each of which contains a bicyclic skeleton having 7 to 11 carbon atoms, tricyclo[3.3.0.0$^{3,7}$]octane, tricyclo[4.2.0.0$^{2,5}$]octane, tricyclo[5.3.0.0$^{1,4}$]nonane, tricyclo[5.2.1.0$^{2,6}$]decane, tricyclo[3.3.1.1$^{3,7}$]decane (adamantane), tricyclo[3.3.2.0$^{2,8}$]decane, tricyclo[4.3.1.1$^{2,5}$]undecane, tricyclo[5.4.0.0$^{2,5}$]undecane, and tricyclo[6.4.0.0$^{1,5}$]dodecane, tricyclo[5.5.1.0$^{3,11}$]tridecane, each of which contains a tricyclic skeleton having 8 to 13 carbon atoms, and spiro[4.4]nonane, spiro[4.5]decane, spiro[5.5]undecane, spiro[5.6]dodecane, spiro[4.7]dodecane, spiro[6.6]tridecane, spiro[5.7]tridecane, spiro[6.7]tetradecane, and spiro[7.7]pentadecane, each of which contains spirocyclic skeleton having 9 to 15 carbon atoms.

The acryloyloxy group may be directly bonded to these rings, or may be bonded to an alkyl group bonded to the rings. Further, there is no particular limitation regarding which carbon of these skeletons an acryloyloxy group or an acryloyloxyalkyl group is bonded to, and this can be appropriately determined in accordance with ease of synthesis. Regarding these bifunctional acrylates, either kind of compounds may be used independently, or a combination of a plurality of compounds may be used.

As bifunctional thiol that is preferable for the present invention, dithiol with a thiol group bonded to both terminals of an alkylene group or a polythiaalkylene group containing 2 to 20 carbon atoms, represented by the following general formula (3), may be cited. Dithiol with a thiol group bonded to both terminals of an alkylene group or a polythiaalkylene group containing 2 to 8 carbon atoms is desirable. Herein, in the case where $R^2$ represents an alkylene group containing 2 to 8 carbon atoms, desirable optical characteristics are likely to be obtained. In the case where $R^2$ represents a polythiaalkylene group containing 2 to 8 carbon atoms, the workability is satisfactory due to low viscosity. In order to realize a high refractive index, it is more desirable that the ratio (C/S) of the number of carbon atoms with respect to the number of sulfur atoms be 2 or less.

(3)

(where $R^2$ represents an alkylene group containing 2 to 20 carbon atoms or a polythiaalkylene group containing 2 to 20 carbon atoms.)

Examples of such dithiol include 1,2-ethanedithiol, 1,3-propanedithiol, 1,4-butanedithiol, di(2-mercaptoethyl) sulfide, di(3-mercaptopropyl) sulfide, 1,8-dimercapto-3,6-dithiaoctane, 1,9-dimercapto-3,7-dithianonane, 1,10-dimercapto-4,7-dithiadecane, 1,11-dimercapto-3,6,9-trithiaundecane, 1,13-dimercapto-4,7,10-trithiatridecane, 1,13-dimercapto-3,7,11-trithiatridecane, 1,14-dimercapto-3,6,9,12-tetrathiatetradecane, 1,15-dimercapto-3,6,10,13-tetrathiapentadecane, 1,16-dimercapto-3,6,11,14-tetrathiahexadecane, 1,16-dimercapto-3,7,10,14-tetrathiahexadecane, and 1,16-dimercapto-4,7,10,13-tetrathiahexadecane, each of which contains a straight-chain structure, and 3,4-dimercaptotetrahydrothiophene, 3,4-di(mercaptomethyl)tetrahydrothiophene, 3,4-di(mercaptoethylthio)tetrahydrothiophene, 3,4-di(mercaptoethylthiomethyl)tetrahydrothiophene, 2,5-di(mercaptomethyl)tetrahydrothiophene, 2,5-di(mercaptoethylthiomethyl)tetrahydrothiophene, 2,3-dimercaptomethyl-1,4-dithiane, 2,5-dimercaptomethyl-1,4-dithiane, 2,3-di(mercaptoethylthiomethyl)-1,4-dithiane, 2,5-di(mercaptoethylthiomethyl)-1,4-dithiane, 2,3-di(mercaptopropylthiomethyl)-1,4-dithiane, 2,5-di(mercaptopropylthiomethyl)-1,4-dithiane, 2,3-di(mercaptoethylthioethyl)-1,4-dithiane, and 2,5-di(mercaptoethylthioethyl)-1,4-dithiane, each of which contains a cyclic structure. Regarding these bifunctional thiols, either kind of compounds may be used independently, or a combination of a plurality of compounds may be used.

The photopolymerization initiator is not particularly limited, and can be appropriately selected if required. Examples of the photopolymerization initiator preferable for the present invention include an acetophenone type, a benzoin type, a benzophenone type, a thioxanthone type, and an acylphosphine-oxide type. In the present invention, as the photopolymerization initiator, one kind of compound selected from these may be used, or a combination of at least two kinds of the compounds may be used. Further, if required, a photopolymerization initiator auxiliary agent may be used. In order to cure a resin at an appropriate rate without degrading the characteristics thereof, it is desirable that the amount to be added of the photopolymerization initiator be 0.1 to 5 wt % of the total amount of a resin precursor.

The resin of the present invention obtained by polymerizing a resin precursor of the present invention has a repetition unit represented by the following general formula (4), for example.

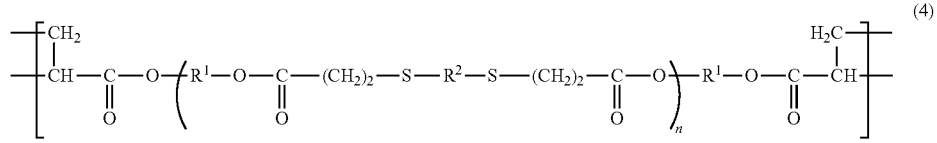

(4)

(where $R^1$, represents a divalent organic group (preferably an alkylene group) containing 7 to 15 carbon atoms having an alicyclic skeleton, $R^2$ represents an alkylene group containing 2 to 20 carbon atoms or a polythiaalkylene group containing 2 to 20 carbon atoms, and n represents a positive integer.)

The curing step in the course of molding a resin can be conducted in a vacuum so as to prevent air bubbles from being mixed. However, if a portion of the components is evaporated in such a case, the composition may become non-uniform. Thus, it is preferable that the molecular weight of the above-mentioned resin precursor compositions all be 180 or more (excluding the photopolymerization initiator).

EXAMPLE 1

A. Preparation of an Acrylate-Terminated Oligomer

Tricyclo[5.2.1.0$^{2,6}$]decanedimethanol diacrylate that is bifunctional acrylate and di(2-mercaptoethyl)sulfide that is bifunctional thiol were mixed in a molar ratio of bifunctional acrylate:bifunctional thiol=3:1 or 2.5:1. When the mixture became uniform, 0.1 wt % of triethylamine was added as a catalyst, followed by further stirring at room temperature, whereby the viscosity of the mixture increased gradually.

After 4 days, an absorbent TOMITA AD700NS (produced by Tomita Pharmaceutical Co., Ltd.) was added to remove the catalyst, followed by stirring, and the adsorbent was removed by filtration. After that, 0.5 wt % of IRGACURE 184 (Ciba Specialty Chemicals) was added as a photopolymerization initiator, followed by further stirring, whereby UV-curable resin precursor compositions "a" and "b" containing an oligomer "a" or "b" were obtained. The UV-curable resin precursor compositions had no odor of thiol.

The oligomers "a" and "b" thus obtained are considered to be acrylate-terminated oligomers having a structure represented by the following structural formula (5). The UV-curable resin precursor compositions "a" and "b" contained about 20 mol % of bifunctional acrylate (i.e., unreacted sustrate acrylate) represented by the structural formula (5) when n=0.

TABLE 1

| RESIN PRECURSOR COMPOSITION | MOLAR RATIO | REFRACTIVE INDEX OF CURED SUBSTANCE $n_d$ (22.5° C.) | MEAN DISPERSION OF CURED SUBSTANCE $n_F - n_C$ (22.5° C.) |
|---|---|---|---|
| a | 3:1 | 1.554 | 0.011 |
| b | 2.5:1 | 1.557 | 0.011 |

Figure 2:
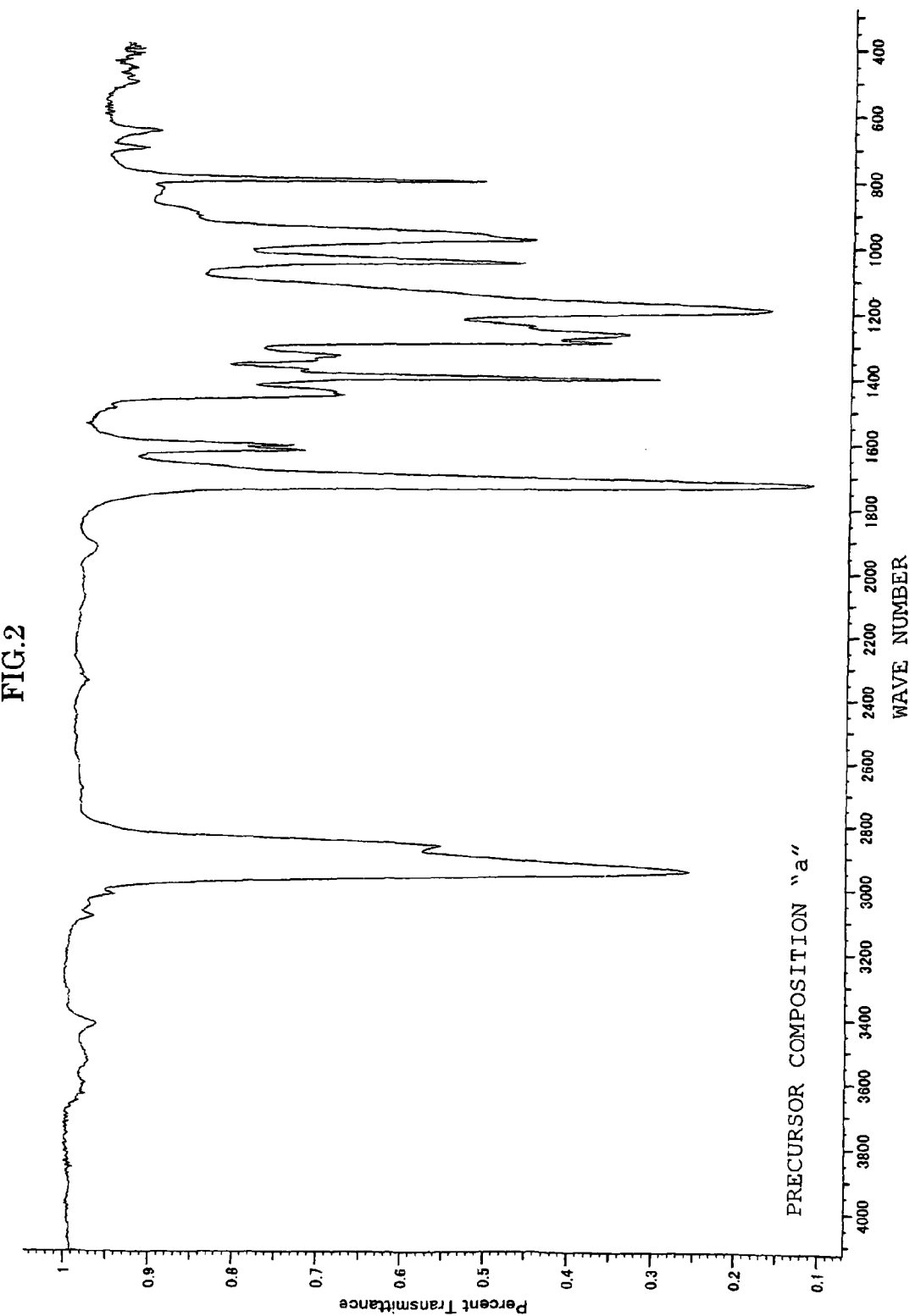
FIG. 2 is an infrared absorption spectrum chart of a UV-curable resin precursor composition "a" according to Example 1 of the present invention.
Figure 3:
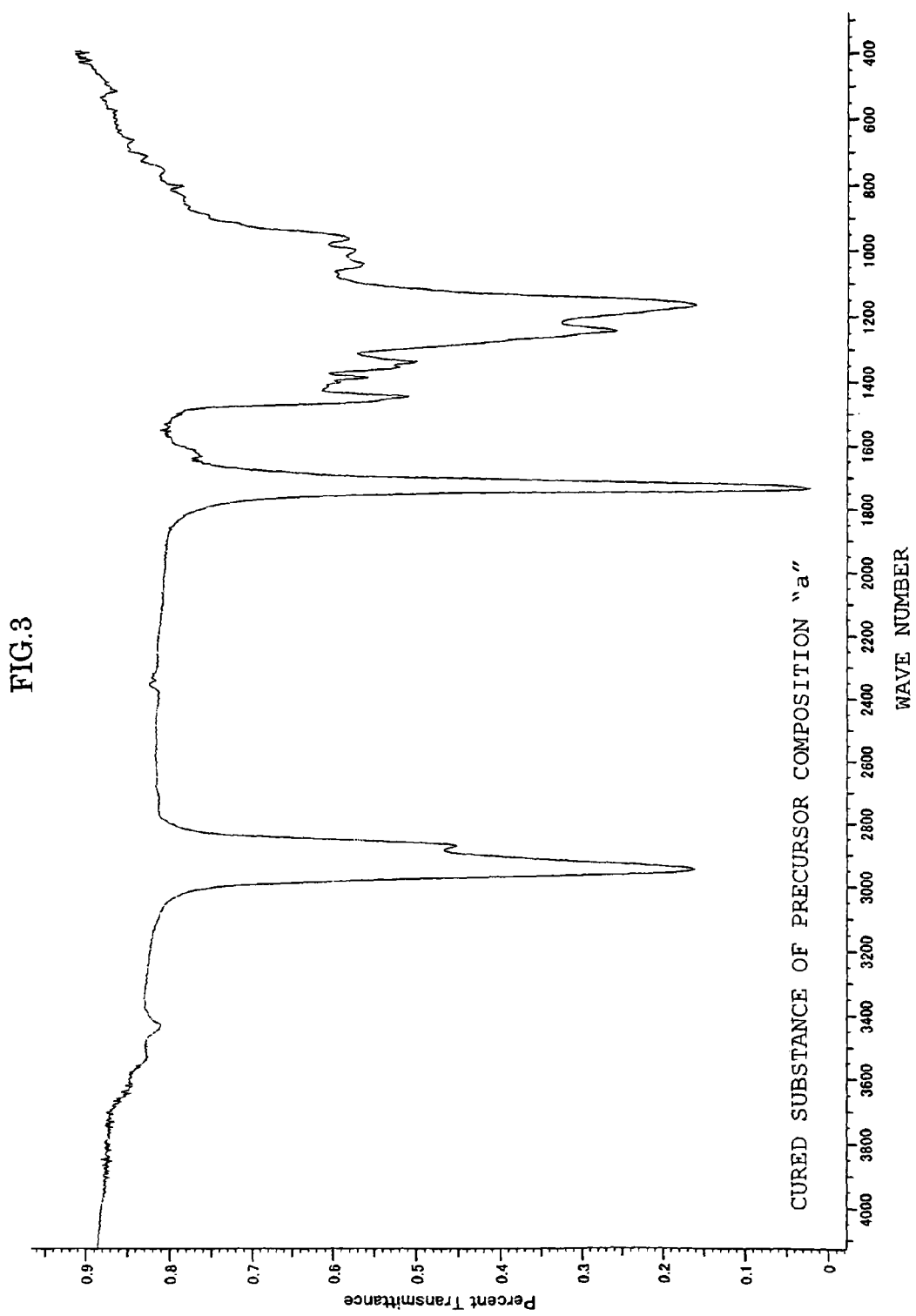
FIG. 3 is an infrared absorption spectrum chart of a cured substance of the precursor composition "a" according to Example 1 of the present invention.

FIGS. 2 and 3 show infrared absorption spectrum charts of the resin precursor composition "a" and the cured substance thereof, respectively.

Figure 4:
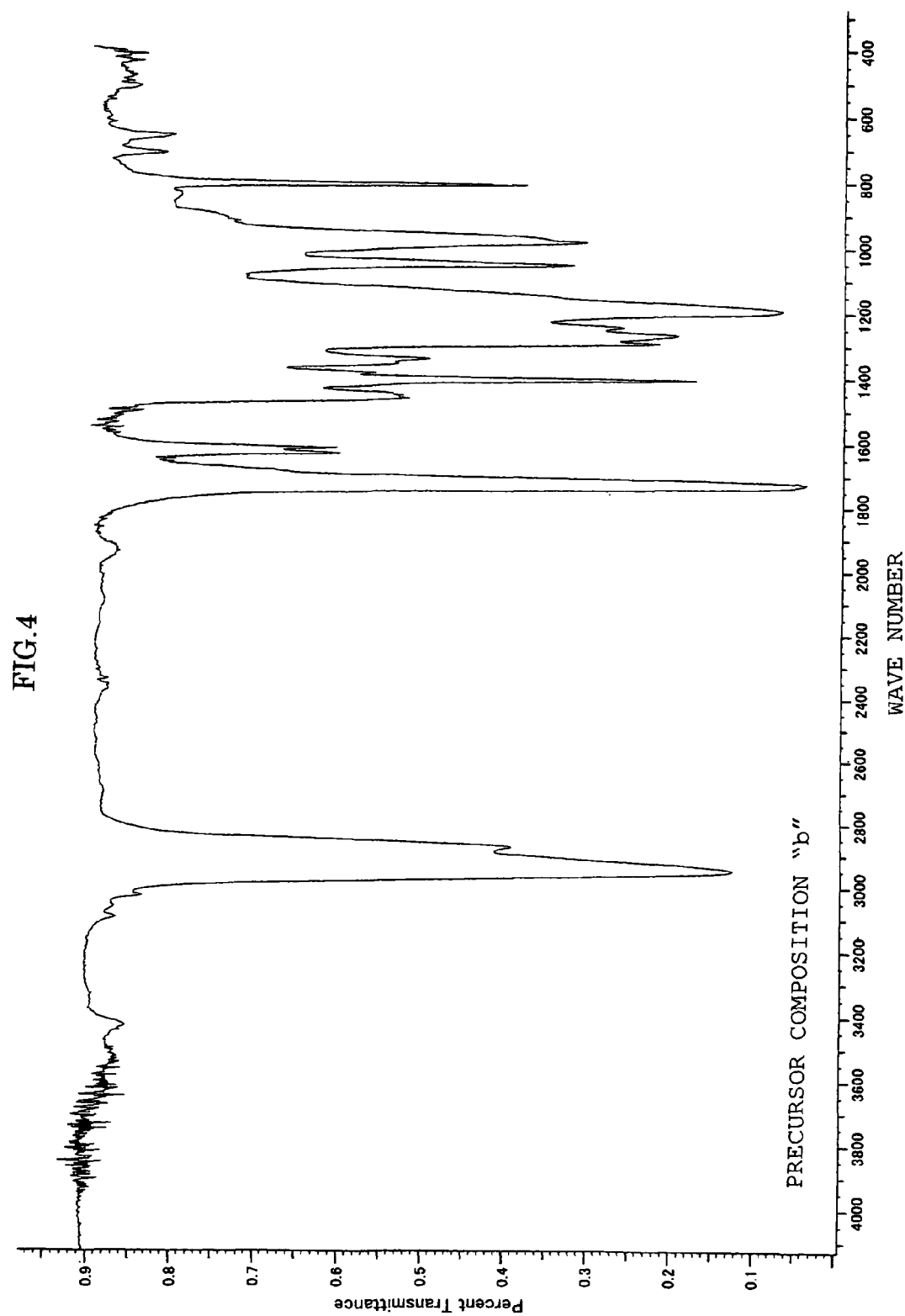
FIG. 4 is an infrared absorption spectrum chart of a UV-curable resin precursor composition "b" according to Example 1 of the present invention.
Figure 5:
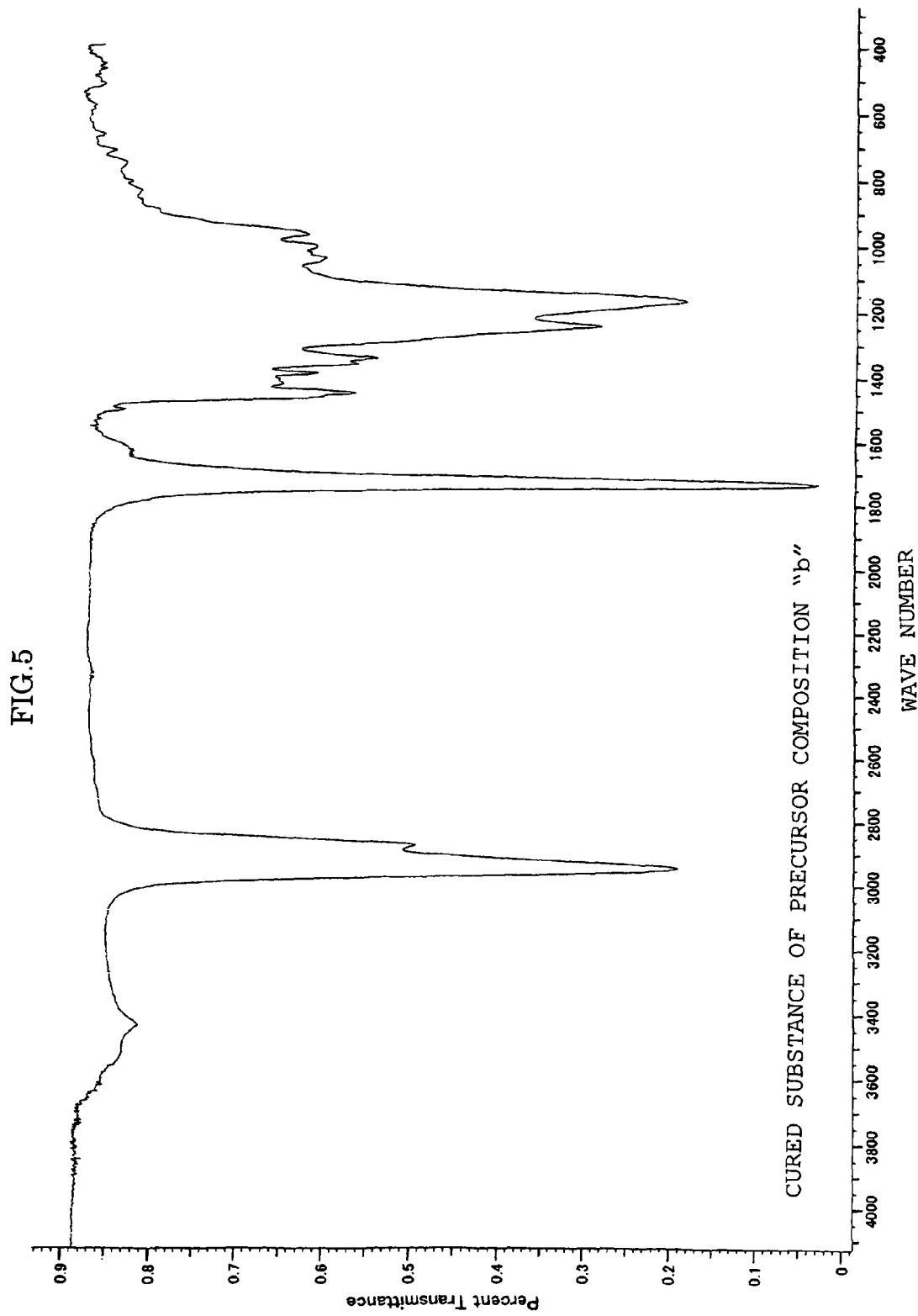
FIG. 5 is an infrared absorption spectrum chart of a cured substance of the precursor composition "b" according to Example 1 of the present invention.

FIGS. 4 and 5 show infrared absorption spectrum charts of the resin precursor composition "b" and the cured substance thereof, respectively.

B. Preparation of a Low-Refractive-Index and High-Dispersion Resin Precursor Composition First, 56 parts by weight of 2,2,3,3,4,4,5,5-octafluorohexane-1,6-diacrylate that is bifunctional fluorine-containing

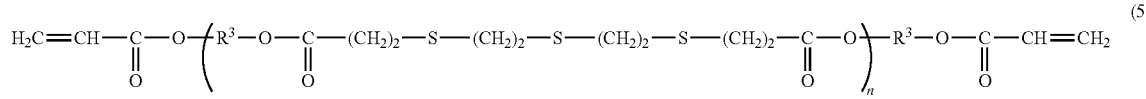

(where $R^3$ represents a hydrocarbon group having a tricyclo[5.2.1.0$^{2,6}$]decane skeleton, represented by the following structural formula (6), and n represents an integer of 1 to 3.)

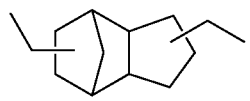

The obtained resin precursor compositions "a" and "b" were cured by irradiation of UV-rays at 8000 mJ/cm$^2$, respectively, and the refractive indices thereof were measured. Consequently, it was found that optical characteristics preferable as a high-refractive-index and low-dispersion optical member of a close-contact multi-layer type diffractive optical element as shown in Table 1 were realized. In the cured substances, no degradation in characteristics caused by optical non-uniformity was found.

acrylate, 43 parts by weight of 9,9-bis[4-(2-acryloyloxyethoxy)phenyl]fluorene that is bifunctional acrylate having a fluorene structure, and 0.5 wt % of IRGACURE 184 (Ciba Specialty Chemicals) that is a photopolymerization initiator were mixed to obtain a low-refractive-index and high-dispersion resin precursor composition.

The obtained low-refractive-index and high-dispersion resin precursor composition was cured by irradiation of UV-rays at 8000 mJ/cm$^2$, and the refractive index thereof was measured. Consequently, it was found that a refractive index $n_d$ at 22.5° C. was 1.528, and a mean dispersion ($n_F-n_C$) was 0.0150.

The resin obtained by curing the low-refractive-index and high-dispersion resin precursor composition is considered to be a net-shaped random copolymer having two repetition units represented by the following structural formula (7).

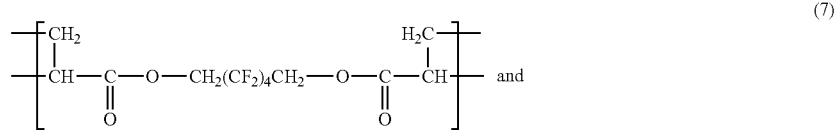

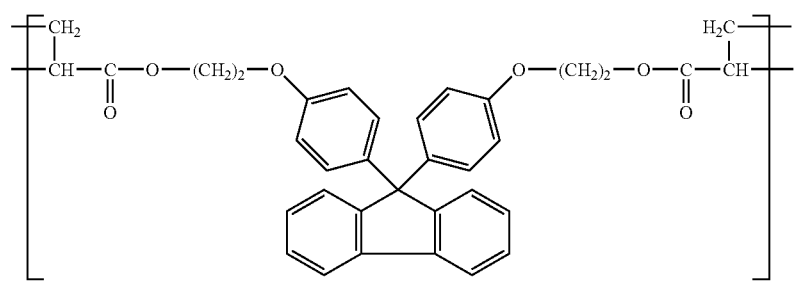

C. Production of a Close-Contact Multi-Layer Type Diffractive Optical Element

Using the high-refractive-index and low-dispersion resin precursor composition "b" obtained in the above-mentioned step A and the low-refractive-index and high-dispersion resin precursor composition obtained in the step B, a close-contact multi-layer type diffractive optical element with an outer diameter of 50 mm and a grating height of 20 μm was produced. The grating pitch of the element was set to 3.5 mm in the vicinity of the center and 0.17 mm in the vicinity of the outer periphery, and set so that the grating pitch decreased toward the outer periphery (circumference).

First, a surface 2 of a glass base material 1, on which a resin layer is to be molded, was treated with silane coupling reagent (Step (a) of FIG. 1). Then, as shown in Step (b) of FIG. 1, the treated surface 2 and a mold 3 having a molding surface in a grating shape as described above were made to oppose each other, and the above-mentioned low-refractive-index and high-dispersion resin precursor composition 4 was applied therebetween. Then, the low-refractive-index and high-dispersion resin precursor composition 4 was cured by irradiation of UV-rays to obtain an optical member 5 made of low-refractive-index and high-dispersion resin, and thereafter, the mold 3 was released (Step (c) of FIG. 1). Subsequently, as shown in Step (d) of FIG. 1, the optical member 5 and a mold 7 having a molding surface in a continuous plane shape or a curved surface shape without a diffraction grating were made to oppose each other, and the high-refractive-index and low-dispersion resin precursor composition 6 obtained in the above-mentioned step was applied therebetween. Then, the high-refractive-index and low-dispersion resin precursor composition 6 was cured by irradiation of UV-rays to obtain an optical member 8 made of a high-refractive-index and low-dispersion resin, and thereafter, the mold 7 was released (Step (e) of FIG. 1).

According to this example, a close-contact multi-layer type diffractive optical element with satisfactory operability having the desired optical characteristics was produced without the degradation in working environment caused by the odor of thiol. The resin constituting the optical member 8 formed in this example is considered to be a net-shaped copolymer made of a repetition unit represented by the following structural formula (8).

(where $R^3$ represents a hydrocarbon group having a tricyclo[$5.2.1.0^{2,6}$]decane skeleton, represented by the above-mentioned structural formula (6), and n represents an integer of 1 to 3.)

EXAMPLE 2

A. Preparation of an Acrylate-Terminated Oligomer

First, 15.22 g of tricyclo[$5.2.1.0^{2,6}$]decanedimethanol diacrylate that is bifunctional acrylate and 1.18 g of 2,5-di(mercaptomethyl)-1,4-dithian that is bifunctional thiol were mixed. When the mixture became uniform, 18.8 mg of triethylamine was added as a catalyst, and the mixture was stirred continually at room temperature.

After the 3 days, the viscosity of the mixture increased to some degree. Then, 1.18 g of 2,5-di(mercaptomethyl)-1,4-dithian was added to the mixture, and the mixture was stirred continually again at room temperature.

After an additional 3 days (6 days in total), the viscosity of the mixture increased further. Then, 1.18 g of 2,5-di(mercaptomethyl)-1,4-dithian was added to the mixture, and the mixture was mixed continually again at room temperature. The final molar ratio was bifunctional acrylate:bifunctional thiol=3:1.

After an additional 4 days (10 days in total), the viscosity of the mixture increased to 11500 cps (22.5° C.). Triethylamine was evaporated at room temperature while the pressure was reduced. After that, 0.5 wt % of IRGACURE 184 (Ciba Specialty Chemicals) was added as a photopolymerization initiator, followed by further stirring, whereby a UV-curable resin precursor composition "c" containing an oligomer "c" was obtained. The UV-curable resin precursor composition had no odor of thiol.

Figure 6:
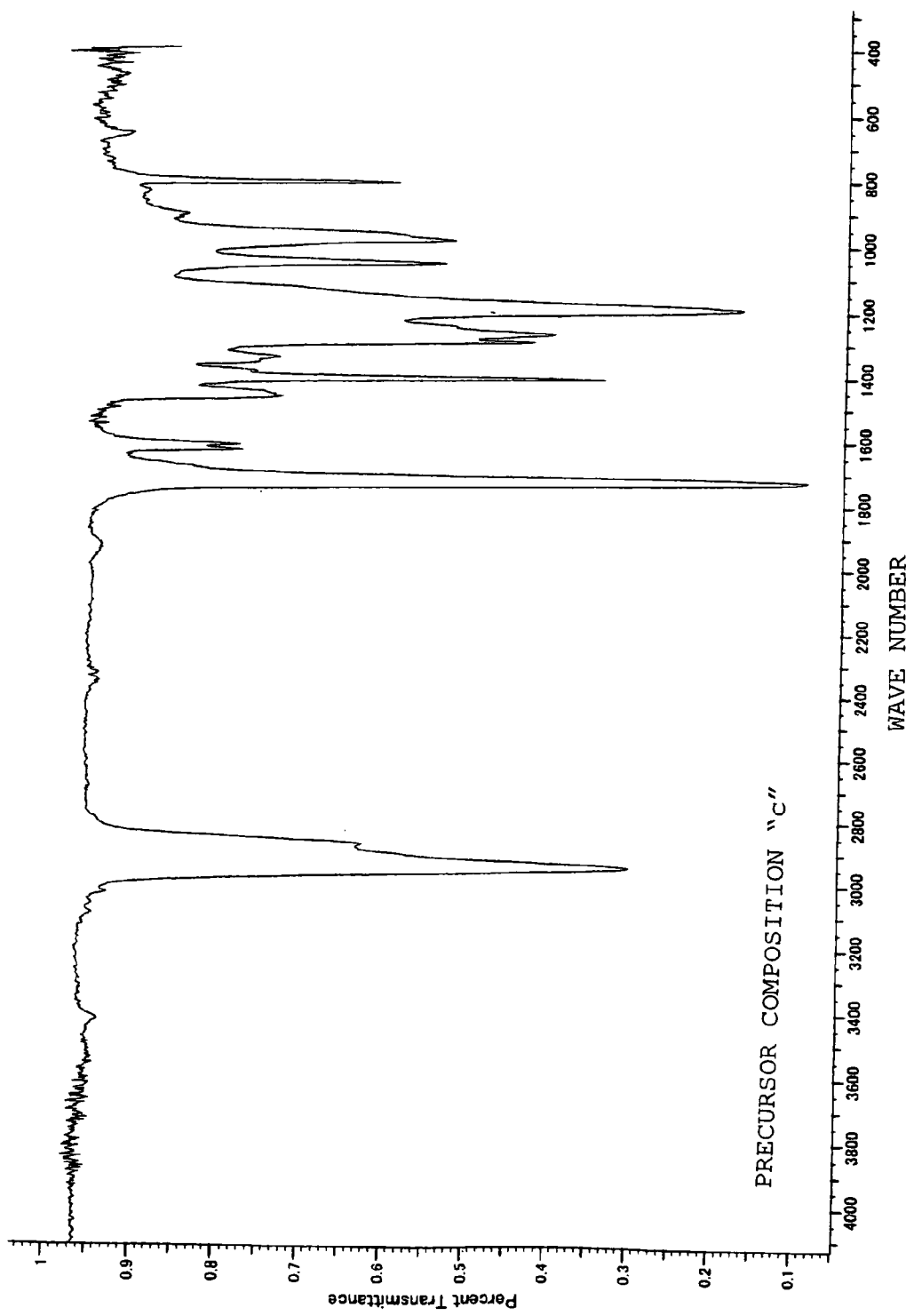
FIG. 6 is an infrared absorption spectrum chart of a UV-curable resin precursor composition "c" according to Example 2 of the present invention.

FIG. 6 shows an infrared absorption spectrum chart of the obtained UV-curable resin precursor composition "c".

The oligomer "c" is considered to be an acrylate-terminated oligomer having a structure represented by the following structural formula (9).

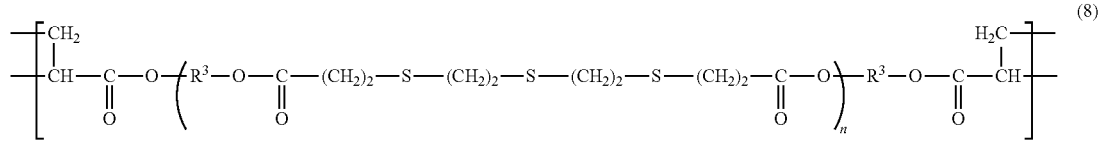

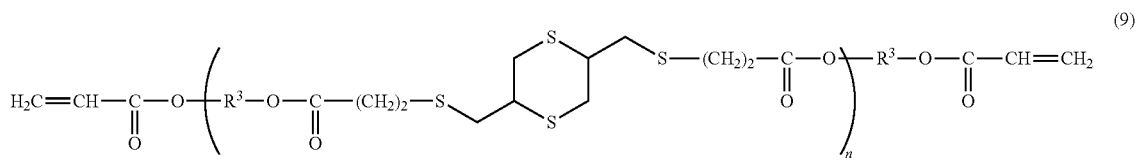

(where $R^3$ represents a hydrocarbon group having a tricyclo[5.2.1.0$^{2,6}$]decane skeleton represented by the following structural formula (6), and n represents an integer of 1 or more.)

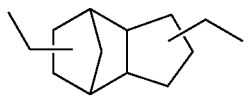

The obtained resin precursor composition "c" was cured by irradiation of UV-rays at 8000 mJ/cm$^2$. A refractive index $n_d$ of the cured substance thus obtained was 1.5577 (22.5° C.), and a mean dispersion ($n_F$–$n_C$) was 0.0111 (22.5° C.). Thus, preferred optical characteristic were realized with a high-refractive-index and low-dispersion optical member of a close-contact multi-layer type diffractive optical element. In the cured substance, no degradation in characteristics caused by optical non-uniformity was found.

Figure 7:
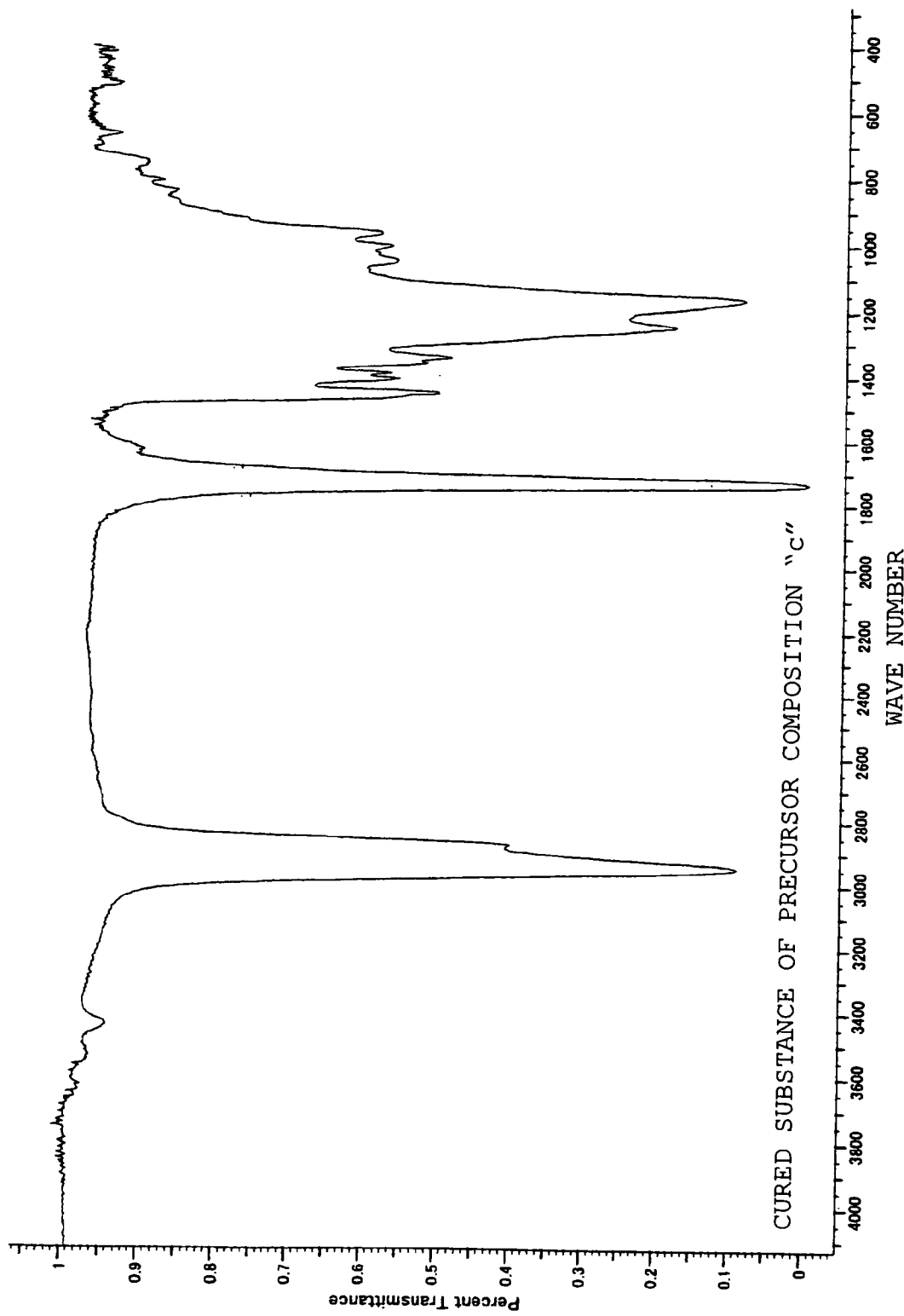
FIG. 7 is an infrared absorption spectrum chart of a cured substance of the precursor composition "c" according to Example 2 of the present invention.

FIG. 7 shows an infrared absorption spectrum chart of the cured substance.

According to the present invention, a close-contact multi-layer type diffractive optical element having a high-refractive-index and low-dispersion resin layer that is optically homogeneous can be produced efficiently without degrading the working environment.

What is claimed is:

1. An acrylate-terminated oligomer, which is represented by the following structural formula (1):

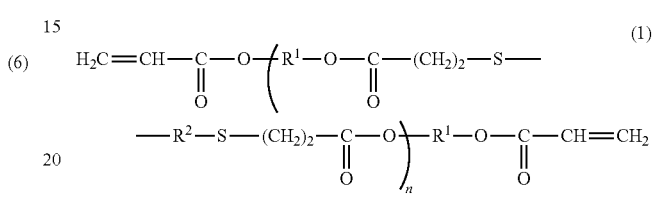

where $R^1$ represents an alkylene group containing 7 to 15 carbon atoms having an alicyclic skeleton, $R^2$ represents one of: an alkylene group containing 2 to 20 carbon atoms and a polythiaalkylene group containing 2 to 20 carbon atoms, and n represents a positive integer.

2. An acrylate-terminated oligomer according to claim 1, wherein the $R^2$ represents one of: an alkylene group containing 2 to 8 carbon atoms and a polythiaalkylene group containing 2 to 8 carbon atoms.

3. An acrylate-terminated oligomer according to claim 1, wherein the acrylate-terminated oligomer is cured to form a resin.

4. A resin precursor composition comprising:
an acrylate-terminated oligomer represented by the following structural formula (1):

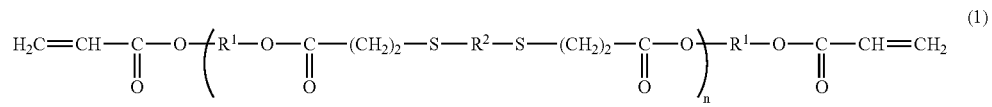

where $R^1$ represents an alkylene group containing 7 to 15 carbon atoms having an alicyclic skeleton, $R^2$ represents one of: an alkylene group containing 2 to 20 carbon atoms and a polythiaalkylene group containing 2 to 20 carbon atoms, and n represents a positive integer; and
a photopolymerization initiator.

* * * * *